Nov. 18, 1941.  F. NICOLAUS ET AL  2,263,365
CABIN FOR AIRCRAFT
Filed May 27, 1939  3 Sheets-Sheet 2
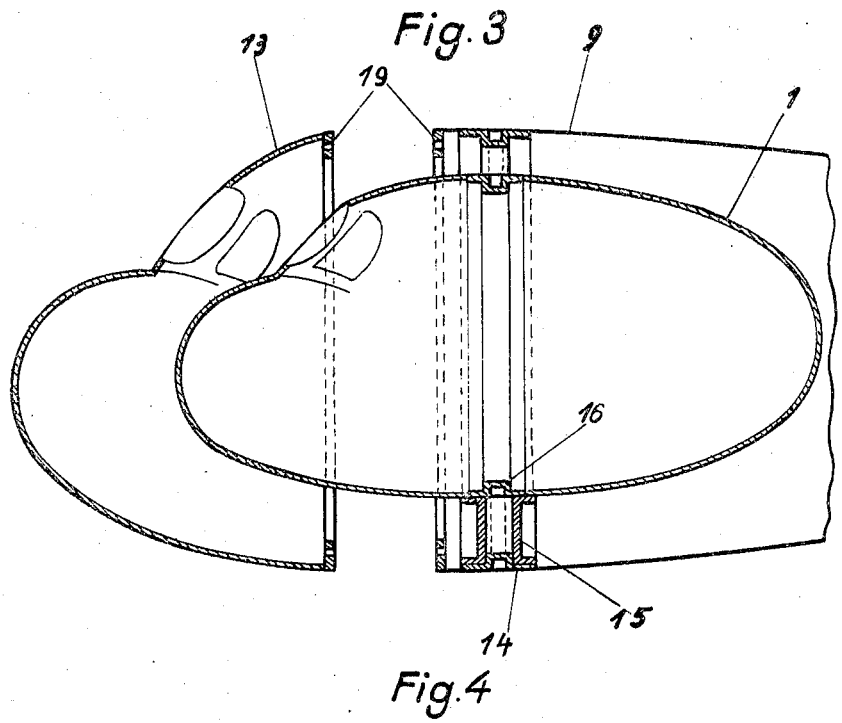
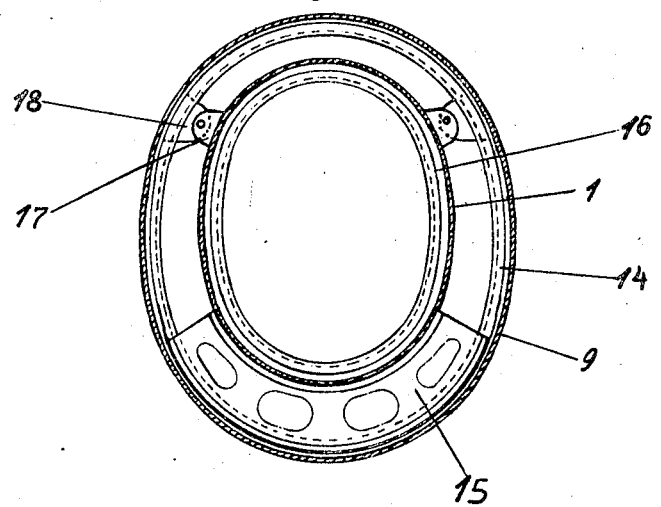

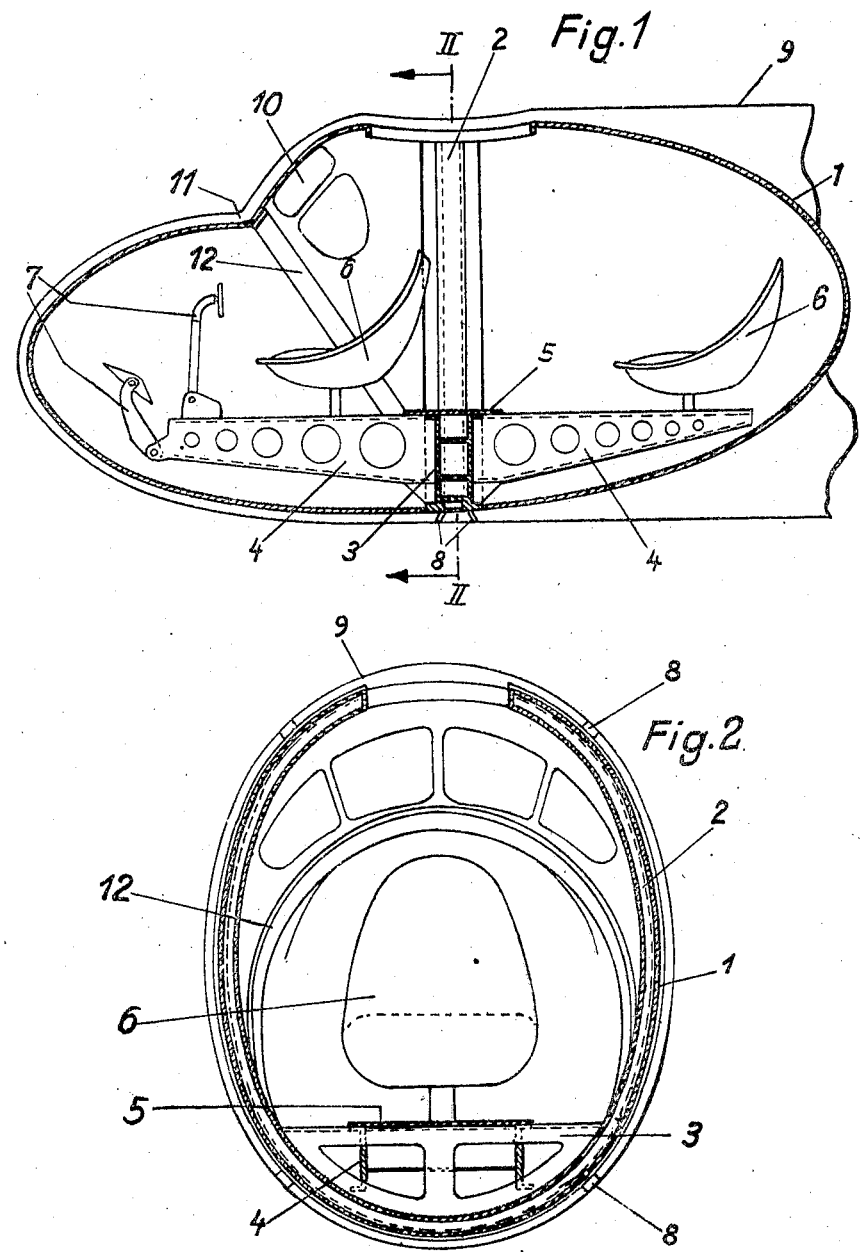

Patented Nov. 18, 1941

2,263,365

UNITED STATES PATENT OFFICE 2,263,365

CABIN FOR AIRCRAFT

Friedrich Nicolaus, Berlin-Wilmersdorf, Hans Regelin, Zeuthen, near Berlin, Hans Neuber, Berlin-Grunau, and Emil Kolland, Berlin-Johannisthal, Germany, assignors to the firm Henschel Flugzeug-Werke Aktiengesellschaft, Schonefeld, Kreis Teltow, Germany Application May 27, 1939, Serial No. 276,152
In Germany June 1, 1938

7 Claims. (Cl. 244—59)

This invention relates to a chamber or cabin subjected to internal excess pressure in altitude airplanes and intended for the reception of occupants and to its arrangement in its aerodynamic shell, such as the fuselage.

In order to save weight cabins of this type are preferably constructed in the form of coverings capable of resisting tensile stress and wholly or partly surrounded by a shape-imparting body not subjected to internal excess pressure, or by the supporting surface.

According to the invention, the cabin is so constructed that within the covering only one buckling-resisting member or spar connected with the framework of the airplane serves as sole support thereof. This member may be arranged inside or outside the covering and supports the installations, such as seats, controls, instruments, arms, etc. with the aid of suitable longitudinal and cross girders connected therewith. When disposed on the outside the member may form part of the static structure of the fuselage fairing or of the structure of the supporting surface. If the chamber is constricted, for instance near the windows in front of the pilot's cockpit, stiffening is effected by ties which are arranged as force transmitting reinforcing members.

Another feature of the invention is that parts of the supporting structure of the cell, particularly supports for spars, are passed through the contour of the cabin and are shut off airtight with respect to it. The cabin may have inward bulges or recesses for receiving and guiding structural members, as the wing support or spar, and comprise also two or more parts preferably united by tubular intermediate members which bridge the member passing through between the cabin parts. It is further possible to provide within the cabin a shaftlike and shut off opening for the wing support or spar.

As at greater altitudes different heat conditions prevail with respect to the heater inner covering and the outer body of the airplane and produce differences in tension which in the long run have a harmful effect, the invention provides elastically yielding members acting as fastening and connecting means between the pressure space of the cabin and the surrounding body and preferably made of material that is not a heat conductor. The elastic means may also be indirectly connected with the pressure chamber and/or the surrounding body by intermediate means that do not conduct heat.

In further accordance with the invention the fuselage surrounding the chamber is fitted with a detachable end cap the maximum width of which in the plane of the connection is equal to or greater than the maximum contour of the covering in the plane of the cross section.

The novelty of the invention set forth herein may be more or less briefly summarized as follows:

In many flying machine types, the cross beams carrying the wings are passed through the body and hence through the cabin. In this type of construction a strong carrying construction is created with comparatively slight weight on the one hand, and, on the other hand, the body is located as low as possible. In altitude flying machines, in which the interior of the separate passenger cabins is maintained under higher air pressure, and heated, the provision of an airtight passage of the cross beams through the cabin walls presents difficulties, particularly due to the varying sag of the cross beams under the changing requirement in flight, which alters the form of the cross beams, if only to a trifle extent, and in conjunction therewith the air tightness at the points of passage of the beams in the cabin walls is destroyed. Besides this, owing to the different heat conditions inside and outside of the cabin, additional stresses occur in the carrying construction of the machine. If, in order to avoid the passage of the cross beams, the closed pressure cabin is built-in above or below the cross beams, this results in the increasing of head resistance because of the greater cross section of the body. On the other hand, if the cabin is placed before or behind the cross beams, an unfavorable load distribution is produced.

The distinguishing characteristic of the present invention resides in the fact that the cross beams serving as wing carriers are passed through the contour of the cabin and closed off from the cabin by air-tight walls or partitions, as the case may be. Moreover, the pressure cabin can be provided with recesses or niches which serve to receive the wing cross beams. Under the condition, the harmful influences of heat changes on the cross beams, and likewise the complex form of the cabin form at the points of passage of the beams therethrough, are avoided. The suppression of the heat outlet through the cross beams makes it feasible to employ fewer heating arrangements and a smaller number of heating means. The cabin can also be formed of two or more sections to leave greater space free for the passage of the cross beams. Moreover, the separate sections thus provided are capable of being joined into a communicating unit by the intermediate pipe connector designed to take care of the interior pressures. In this manner, the spaces can be heated in common and kept at an absolute pressure. Moreover, provision can be made which renders it feasible to shut off the spaces from each other by partitions. In the event the most desirable form provides for the passage of the cross beams through a more central height in the cabin, the cross beam construction can be arranged to pass through the cabin by the provision of a walled passage through the cabin. In this type last mentioned, the cabin can be connected to the cross beam construction by elastic members so that it will be exclusively, or in the main part, carried by such beams.

The invention is illustrated by way of example in the accompanying drawings, in which Figure 1 is a central longitudinal section of the covering forming the chamber;

Fig. 2, a cross section on the line II—II, of Fig. 1;

Fig. 3, a central longitudinal section of the covering and corresponding body portion with loosened end cap;

Fig. 4, a cross section of the covering and body;

Figure 5:
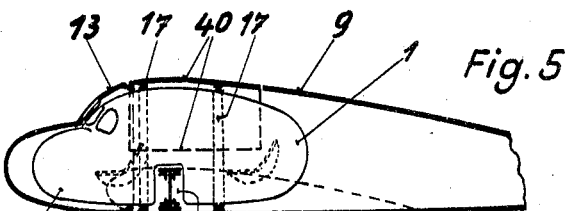
Figs. 5 and 6 show pressure cabins built into a low-wing monoplane and provided in their lower portions with recesses for the spar.

The chamber 1 is built as a covering capable of resisting tensile stress and has an oval cross section as indicated in Figs. 1 and 2. The covering may be formed in known manner from sheet metal sections and caplike members and be constricted at 11 within range of the windows 10 in front of the cockpit. The covering 1 is carried by a member 2 disposed on the inside of the covering 1. Within range of the constriction 11 ties 12 are provided for reinforcement. The member 2 possess suitable points 8 for connection with the framework of the airplane. The installations within the chamber 1, such as the seats 6, controls 7, etc., are secured to a longitudinal girder 4 connected with the member 2 by a bridge 3 and strap 5. The girder 4, and thereby the member 2, support all installations, and the covering 1 is therefore stressed only by the tensile forces due to internal excess pressure but is not affected by load. The chamber 1 is surrounded by a shape-imparting fairing 9 between which and the wall of the chamber cooling air or a gaseous heating medium may be provided.

The member 2 may be arranged also on the outside of the covering 1 and built into the framework of the craft so as to form a part of the static structure. The body 9 surrounding the chamber 1 as an aerodynamic cover is divided at 19 to form an end cap 13 detachably secured to the body 9, as indicated in Fig. 3, the internal diameter of the opening at the dividing point coresponding to the maximum contour of the chamber 1 in the plane of cross section. Near the dividing point 19 the body 9 discloses a bulkhead 14 with support 15 for securing the chamber 1 provided with an inner bulkhead 16. The connecting points 17, 18 of the chamber 1 are easily accessible after removal of the end cap 13, as indicated in Fig. 4.

Fig. 5 shows a cabin built into a low-wing monoplane and provided with an inward bulge 21 for the spar 20. To remove the cabin the front hood 13 is taken off and the flap 40 turned up. The fastening means 17 arranged in two rings around the cabin are then loosened, those of the front ring being readily separated after removal of the cap 13, whereas those of the rear ring can be conveniently reached through handholes disposed in the outer cover.

Figure 6:
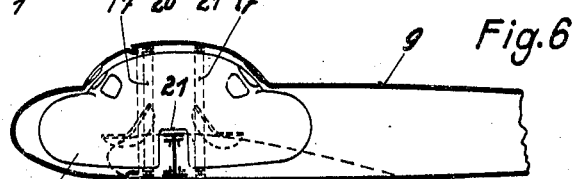

Fig. 6 shows a pressure cabin also built into a low-wing monoplane, similarly to the one shown in Fig. 5, and dismountable through the hood 13 after the member 20 has been disconnected from the outer wing spars.

Figure 7:
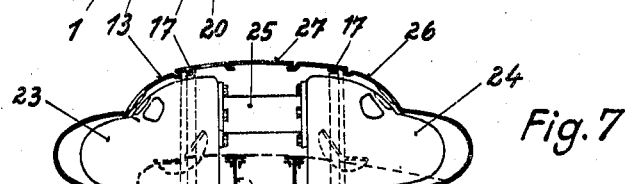
Fig. 7 shows a cabin comprising two parts and built into a low-wing double fuselage monoplane.

The cabin shown in Fig. 7 comprises a front space 23 for the pilot, a gunner's space 24 and an intermediate member 25 connecting the two spaces. The cabin is built into a multiengined low-wing monoplane, in which the bodies carrying the tail unit are disposed behind the engines to leave a free field of observation in the front and rear of the cabin. The cabin can be detached by removing at first the front hood 13 and the rear hood 26, separating through the flap 27 the intermediate member 25 from the two cabin portions 23, 24 and finally loosening the fastening means 17.

Figure 8:
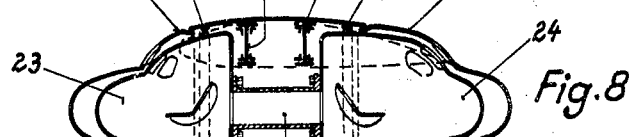
Fig. 8 shows a pressure cabin built into a high-wing monoplane and constructed similarly to the one shown in Fig. 7.

Fig. 8 shows the arrangement of a composite cabin of the type seen in Fig. 7 in a high-wing plane.

Figure 9:
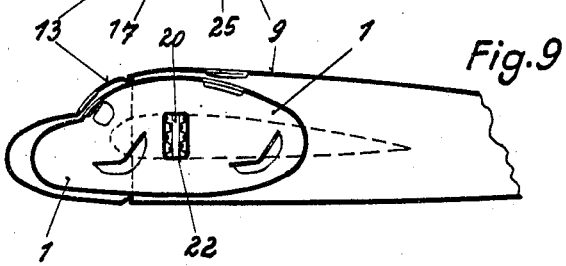
Fig. 9 is a longitudinal section of a pressure cabin in a semi-high wing monoplane, in which the spar passes through a shaft inserted in the cabin.
Figure 10:
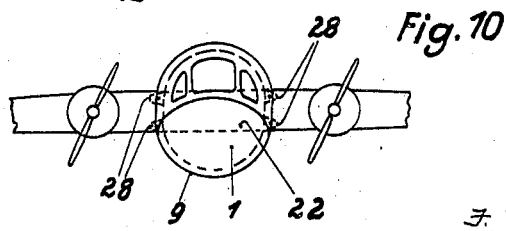
Fig. 10 is an elevation of the structure shown in Fig. 9, as seen at right angles to Fig. 9.

The construction illustrated in Figs. 9 and 10 shows a pressure cabin provided with a spar 20 guided through a shaft 22, the cabin being arranged on the spar by means of elastic supports and can be dismounted by separating the spar from the wing spars at the connecting points 28.

Besides the means indicated in connection with the mounting methods described, other suitable arrangements for fastening the cabin and facilitating its installation and removal may be made.

We claim:

1. The combination with the framework and supporting surfaces of a high altitude aircraft, of a cabin therein for the reception of persons and comprising an inherently stable covering having the form of a closed shell and capable of resisting excess internal air pressure stresses, and an annular buckling-resisting spar means connected with said covering and adapted to be connected with the framework of the craft so as to constitute the sole support for sustaining the cabin within the framework, said framework including wing supporting means passing through the contour of the cabin and having an airtight seal relative to the interior of the cabin.

2. An altitude flying machine as claimed in claim 6, wherein the cabin is provided with an inward bulge forming a recess to receive the wing supporting portions of the framework of the craft and housing the same within the contour of the cabin.

3. An altitude flying machine, as claimed in claim 6, wherein the cabin has the form of a plurality of closed shell sections spaced from each other, stress and tubular means disposed intermediate said shell sections for structurally interconnecting the same and establishing intercommunication therebetween, combined with a framework including wing supporting means passing between the shell sections.

4. The combination with the framework and supporting surfaces of a high altitude aircraft, of a cabin comprising an inherently stable covering having the form of a closed shell and capable of resisting internal air pressure stress, and a buckling-resisting spar rigidly connected with said covering and adapted to be connected with the framework of the craft so as to constitute the sole support for the cabin, said framework including wing supporting means passing through the contour of the cabin, said buckling-resisting spar constituting a hollow shaft for enclosing the wing supporting means.

5. In a high altitude aircraft of the class described, an airtight cabin structure comprising and inherently stable covering having the form of a closed shell capable of resisting internal air pressure stresses during flights at high altitudes, an aircraft supporting structure surrounding the cabin in spaced relation thereto, buckling-resisting spar means extending around said cabin and secured thereto and to the spaced supporting structure and constituting reinforcing means for said cabin structure and sole supporting means between the cabin structure and the aircraft supporting structure, and aircraft control means and passenger supporting means secured to said buckling-resisting spar means.

6. An altitude flying machine, comprising a streamlined carrying body, a cabin therein arranged in spaced relation to the body walls, said cabin being subject to internal heating and pressure, and the walls thereof having sufficient tensile strength to resist incidental internal stresses, wings connected to the sides of the body and provided with cross-beams carrying said body and forming in the interior of the body united rigid members which pass through the contour of the cabin and throughout said passage through the contour being sealed off from the cabin by air-tight walls.

7. An altitude flying machine as set forth in claim 6, in which a walled passage through the cabin is provided through which the wing cross-beams extend.

FRIEDRICH NICOLAUS.
HANS REGELIN.
HANS NEUBER.
EMIL KOLLAND.